(12) United States Patent
Uchiyama

(10) Patent No.: US 11,394,867 B2
(45) Date of Patent: Jul. 19, 2022

(54) LENS APPARATUS, CAMERA, AND NON-TRANSITORY COMPUTER-READABLE STORAGE MEDIUM

(71) Applicant: CANON KABUSHIKI KAISHA, Tokyo (JP)

(72) Inventor: Minoru Uchiyama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 64 days.

(21) Appl. No.: 16/886,459

(22) Filed: May 28, 2020

(65) Prior Publication Data

US 2020/0382716 A1    Dec. 3, 2020

(30) Foreign Application Priority Data

May 30, 2019 (JP) .............................. JP2019-101783

(51) Int. Cl.
*H04N 5/232* (2006.01)
*H04N 5/225* (2006.01)

(52) U.S. Cl.
CPC ..... *H04N 5/232125* (2018.08); *H04N 5/2253* (2013.01); *H04N 5/2254* (2013.01); *H04N 5/23227* (2018.08); *H04N 5/23296* (2013.01)

(58) Field of Classification Search
CPC ........... H04N 5/232125; H04N 5/2253; H04N 5/2254; H04N 5/23227; H04N 5/23296; H04N 5/23209; H04N 5/232122; H04N 5/232123; H04N 5/23212; G02B 7/021; G02B 7/08; G02B 27/0025; G02B 7/102; G02B 7/28; G03B 3/10; G03B 17/14

See application file for complete search history.

(56) References Cited

U.S. PATENT DOCUMENTS

| 9,813,603 B2 * | 11/2017 | Ito ............................. G02B 7/36 |
| 2011/0234768 A1 * | 9/2011 | Pan ......................... G03B 19/07 348/47 |
| 2012/0262595 A1 * | 10/2012 | Kishida .................. G03B 13/36 348/220.1 |
| 2013/0107105 A1 | 5/2013 | Ishikawa |

(Continued)

FOREIGN PATENT DOCUMENTS

| JP | 2014-178639 A | 9/2014 |
| JP | 6458336 B2 | 1/2019 |

*Primary Examiner* — Shahbaz Nazrul
(74) *Attorney, Agent, or Firm* — Canon U.S.A., Inc. IP Division

(57) ABSTRACT

The lens apparatus according to the present invention includes an optical system including a plurality of lens units configured to move in adjusting an in-focus state of a subject image, a detection unit configured to detect respective positions of the plurality of lens units, an acquisition unit configured to acquire position information regarding a single position representing the respective positions of the plurality of lens units corresponding to a current subject distance, based on the respective positions of the plurality of lens units and relational information indicating a relation between a subject distance and the respective positions of the plurality of lens units, and a control unit configured to control the respective positions of the plurality of lens units based on the position information acquired by the acquisition unit.

17 Claims, 13 Drawing Sheets

(56) References Cited

U.S. PATENT DOCUMENTS

| | | | |
|---|---|---|---|
| 2014/0079380 A1* | 3/2014 | Taguchi | G03B 7/04 396/63 |
| 2018/0164540 A1 | 6/2018 | Kawamura | |
| 2019/0064475 A1* | 2/2019 | Kobayashi | H02K 41/0354 |

* cited by examiner

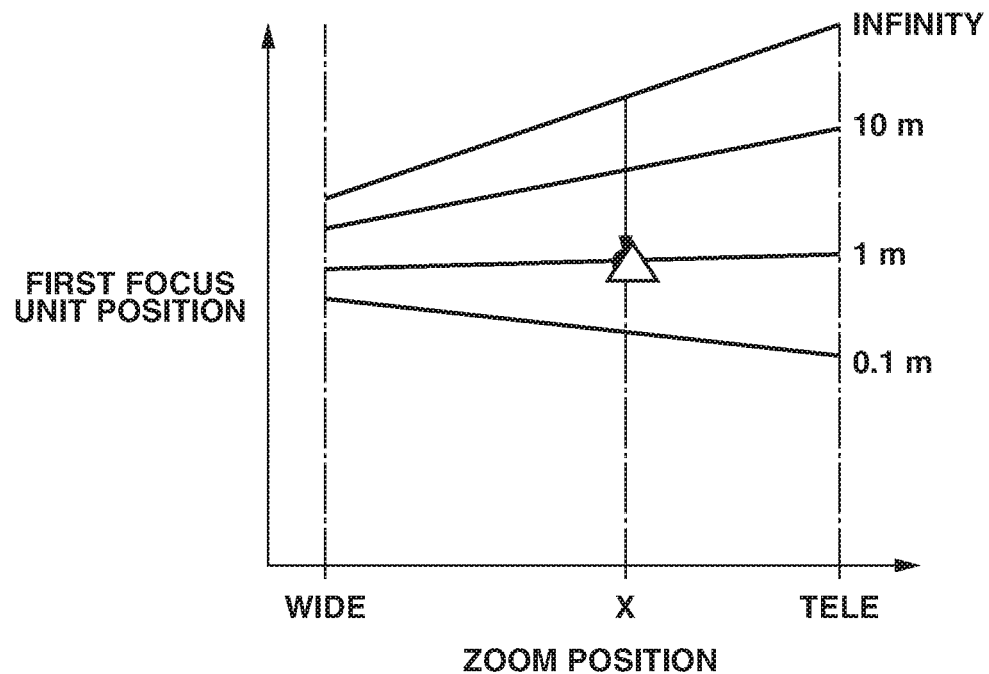
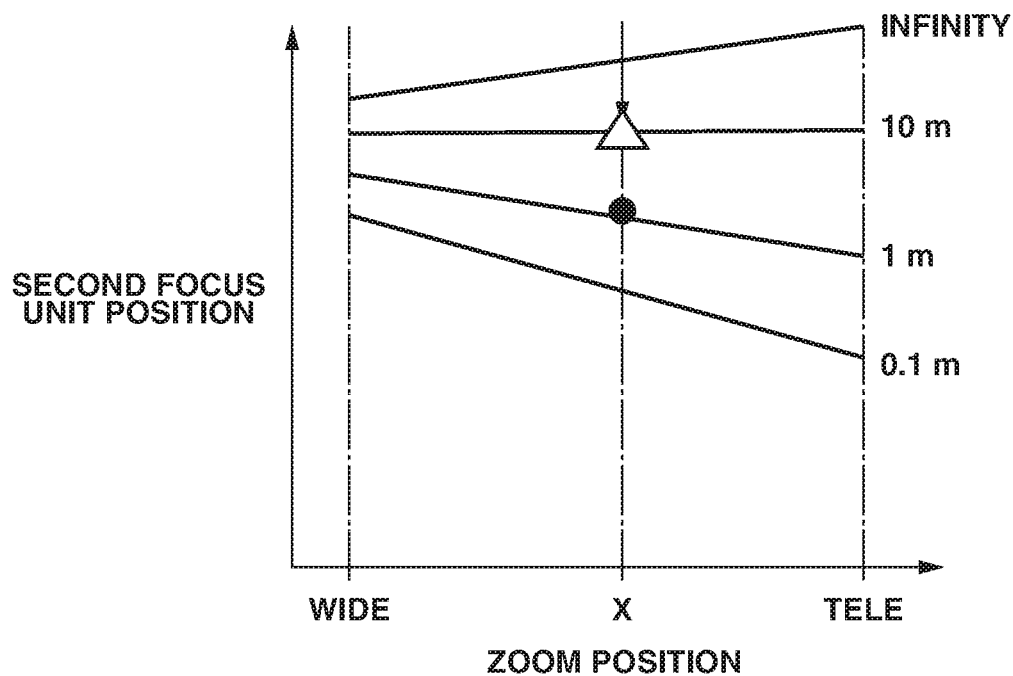

$d = L \times S$

LENS APPARATUS, CAMERA, AND NON-TRANSITORY COMPUTER-READABLE STORAGE MEDIUM

BACKGROUND OF THE INVENTION

Field of the Invention

The present invention relates to a lens apparatus, a camera, and a non-transitory computer readable storage medium.

Description of the Related Art

Typical camera systems have been available which perform automatic focus (AF) control. In this automatic focus control, a camera detects the in-focus state of a subject and generates a driving command to drive a focus unit including lenses which move to adjust the in-focus state. A lens apparatus is utilized to move the focus unit based on the driving command. The driving command is generated based on the correspondence relation between the current position of the focus unit and the defocus amount obtained in advance by the camera.

Although many typical lens apparatuses have one focus unit, lens apparatuses having a plurality of focus units, such as the lens apparatus discussed in United States Patent Application Publication No. 20180164540, have been proposed.

In an interchangeable-lens camera system in which both a lens apparatus having one focus unit and a lens apparatus having a plurality of focus units are attached to a camera, the camera needs to suitably issue driving commands to the lens apparatus regardless of the number of focus units.

As one method, it is assumed that the driving command for the focus unit to be transmitted from the camera to the lens apparatus is changed depending on the number of focus units included in the attached lens apparatus. For example, if the lens apparatus has one focus unit, the camera transmits one driving command to the lens apparatus. If the lens apparatus has two focus units, the camera transmits two driving commands to the lens apparatus. However, this method requires the update of a typical camera program capable of generating and transmitting only one driving command to a program capable of generating and transmitting driving commands depending on the number of focus units included in the attached lens apparatus. In addition, errors may be likely to occur in the camera system because of complicated control and communication.

As another method, only a driving command for one focus unit is generated and transmitted even if a lens apparatus having a plurality of focus units is attached to the camera. In such a case, the position of one of the focus unit of the plurality of focus units is associated with the positions of the other focus units of the plurality of focus units on a one-to-one basis in the lens apparatus, and only the driving command related to any one of the focus units is handled between the lens apparatus and the camera. However, if the movement of any one of the focus units lags behind the others, this control method will collapse the correspondence relation between the focus unit position and the defocus amount subjected to the driving command Particularly in control (continuous AF) in which the defocus amount detection and the driving command generation are repeated before image capturing and in automatic focus control during moving image capturing, a suitable driving command cannot be generated because of the lag in the movement of a focus unit. This may make it difficult to accurately perform automatic focus control.

SUMMARY OF THE INVENTION

The present invention has been devised in view of the above-described issue, and is directed to offering a lens apparatus for accurately performing automatic focus control by using a plurality of focus units, a camera, a camera system, and a control method.

According to an aspect of the present invention, a lens apparatus attachable to and detachable from a camera includes an optical system including a plurality of lens units configured to move in adjusting an in-focus state of a subject image, a detection unit configured to detect respective positions of the plurality of lens units, an acquisition unit configured to acquire, based on the respective positions of the plurality of lens units detected by the detection unit and relational information indicating a relation between a subject distance and the respective positions of the plurality of lens units, position information regarding a single position representing the respective positions of the plurality of lens units corresponding to a current subject distance, and a control unit configured to control the respective positions of the plurality of lens units based on the position information. According to another aspect of the present invention, a camera that a lens apparatus having an optical system including a plurality of lens units configured to move in adjusting an in-focus state of a subject image is attachable to and detachable from, includes an image sensor, a defocus detection unit configured to detect the in-focus state by using the image sensor, and a generation unit configured to generate a driving command for the lens apparatus based on a detection result detected by defocus detection unit, and position information about a single position representing respective positions of the plurality of lens units corresponding to a current subject distance, the position information being acquired from the lens apparatus. According to yet another aspect of the present invention, a non-transitory computer-readable storage medium storing instructions that, when executed by a computer of a lens apparatus attachable to and detachable from a camera, cause the computer to perform a control method. The control method includes detecting respective positions of a plurality of lens units configured to move in adjusting an in-focus state of a subject image, acquiring, based on the detected respective positions of the plurality of lens units and relational information indicating a relation between a subject distance and the respective positions of the plurality of lens units, position information about a single position representing the respective positions of the plurality of lens units corresponding to a current subject distance, and controlling the respective positions of the plurality of lens units based on the position information.

Further features of the present invention will become apparent from the following description of exemplary embodiments with reference to the attached drawings.

BRIEF DESCRIPTION OF THE DRAWINGS

FIGS. 8A and 8B each illustrate a relation between a zoom position and a focus unit position for each subject distance.

DESCRIPTION OF THE EMBODIMENTS

Figure 1:
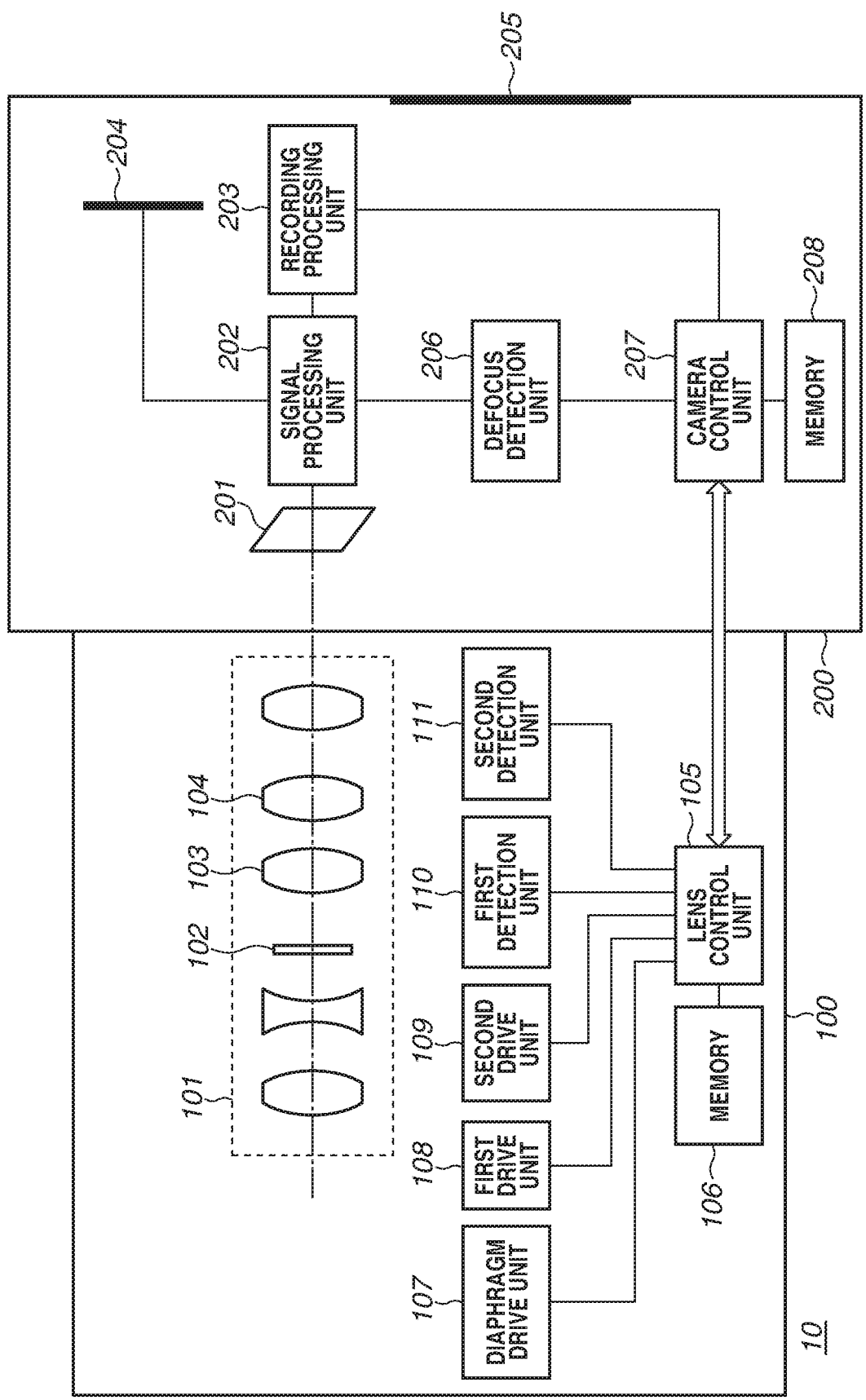
FIG. 1 illustrates a configuration of a camera system according to a first exemplary embodiment.

A lens apparatus, a camera, a camera system, and a method for controlling focus units according to exemplary embodiments of the present invention will be described in detail below with reference to the accompanying drawings. In the following drawings, identical components are assigned the same reference numerals, and duplicated descriptions thereof will be omitted.

(Camera System Configuration)

A first exemplary embodiment of the present invention will be described below. FIG. 1 illustrates a configuration of a camera system 10 according to the present exemplary embodiment. The camera system 10 is an interchangeable-lens camera system. Both a lens apparatus having one focus unit and a lens apparatus having a plurality of focus units are used as a lens apparatus attachable to and detachable from a camera body 200.

In the present specification, a "focus unit" refers to a lens unit including one or a plurality of lenses moving along the same locus in focusing. If a lens that does not move or a lens that moves along a locus in focusing is disposed between two lenses moving along the same another locus, the two lenses belong to different focus units.

FIG. 1 illustrates a lens apparatus 100 having a plurality of focus units. The lens apparatus 100 includes an optical system 101 capable of forming a subject image on an image sensor 201 of the camera body 200. According to the first exemplary embodiment, the optical system 101 is a fixed focal length lens.

The optical system 101 includes a first focus unit (first lens unit) 103 and a second focus unit (second lens unit) 104 moving along the optical axis of the optical system 101 in adjusting the in-focus state of the subject image. Although, in the first exemplary embodiment, mainly the first focus unit 103 is moved to adjust in-focus state, and the second focus unit 104 is moved to make fine adjustment of aberration correction and in-focus state, the role of each individual focus unit is not limited thereto.

A lens control unit (acquisition unit, control unit, communication unit, and determination unit) 105 is a computer including a central processing unit (CPU). The lens control unit 105 is electrically connected to a memory 106, a diaphragm drive unit 107, a first drive unit 108, a second drive unit 109, a first detection unit 110, and a second detection unit 111.

The lens control unit 105 functions as a control unit for controlling the positions of the first focus unit 103 and the second focus unit 104 via the first drive unit 108 and the second drive unit 109. The lens control unit 105 functions as an acquisition unit for acquiring position information about a single position representing the positions of the first focus unit 103 and the second focus unit 104 corresponding to the current in-focus position. The position information about the single position is position information for a composite focus unit when a virtual focus unit representing the first focus unit 103 and the second focus unit 104 is assumed as a composite focus unit. In addition, the lens control unit 105 functions as a communication unit for communicating necessary information with the camera control unit 207 in automatic focus control. For example, the lens control unit 105 transmits information about the position of the composite focus unit (also referred to as composite focus unit position), the focus sensitivity of the composite focus unit, and the pulse conversion coefficient required to generate a driving command, and receives a command to drive the composite focus unit. These pieces of information and the functions of the lens control unit 105 will be described in detail below.

The lens control unit 105 reads a program for automatic focus control from the memory 106 and executes the program. The lens control unit 105 also reads information to be transmitted to the camera control unit 207 and information necessary for the calculation from the memory 106.

The memory 106 includes a read only memory (ROM) and a random access memory (RAM), and serves as a storage unit for storing information. The memory 106 pre-stores information indicating the relation between each of the positions of the first focus unit 103 and the second focus unit 104 and the subject distance (first relational information), and information indicating the relation between the position of the composite focus unit and the subject distance (second relational information). The memory 106 stores the focus sensitivity of the first focus unit 103 and the focus sensitivity of the second focus unit 104. The memory 106 stores the composite focus sensitivity corresponding to the combination of the positions of the first focus unit 103 and the second focus unit 104 (focus sensitivity information). The memory 106 also stores the program of the flowchart for the lens side processing illustrated in FIG. 5 (described below) and information necessary for automatic exposure and automatic light adjustment which is performed by the camera body 200.

The diaphragm drive unit 107 adjusts the aperture diameter of an aperture diaphragm 102 included in the optical system 101 based on a command from the lens control unit 105.

The first drive unit 108 moves the first focus unit 103 based on a command from the lens control unit 105, and the second drive unit 109 moves the second focus unit 104 based on a command from the lens control unit 105.

Figure 2:
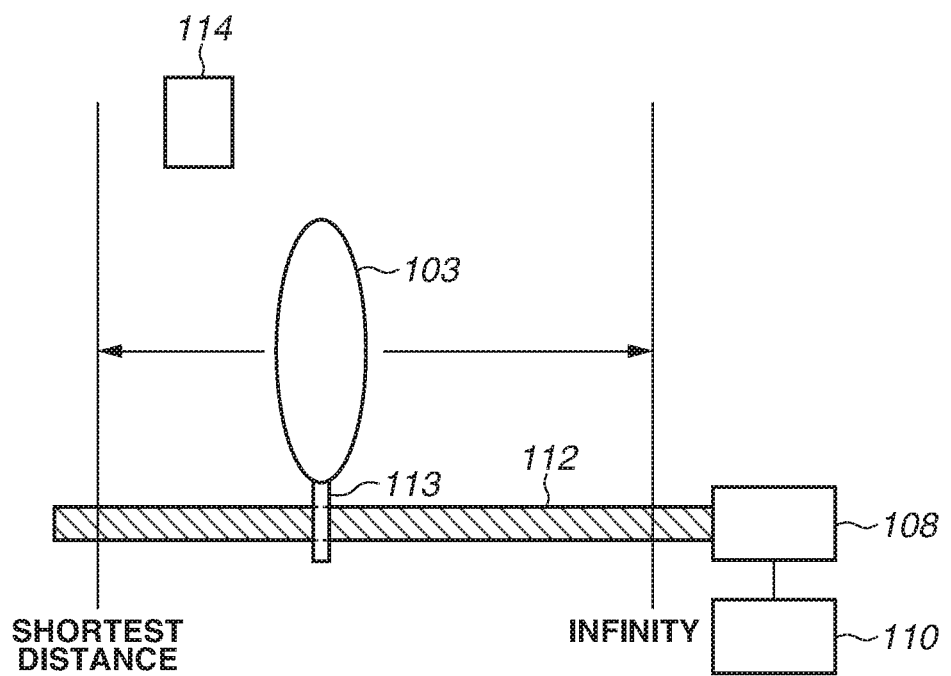
FIG. 2 illustrates movement control for a focus unit.

Movement control for the first focus unit 103 will be described below with reference to FIG. 2. To the first drive unit 108 as a stepping motor, a lead screw 112 is coupled. The first focus unit 103 is coupled to the lead screw 112 via a rack 113.

When the first drive unit 108 is driven based on a command from the lens control unit 105, the lead screw 112 rotates, and the first focus unit 103 moves along the shaft of the lead screw 112 together with the rack 113. The first drive unit 108 is controlled based on the number of pulses indicating the target absolute position for the first focus unit 103.

The lens apparatus 100 includes the first detection unit 110 and the second detection unit 111 as detection units for detecting the respective positions of the plurality of focus units.

The first detection unit 110 detects the position of the first focus unit 103 and outputs the detection result to the lens control unit 105. With the position of a photo-interrupter 114 as the reference position, the first detection unit 110 resets the count of the number of pulses and counts the number of pulses required to move the first focus unit 103 from the reference position to the current position, thus detecting the absolute position of the first focus unit 103.

Movement control for the second focus unit 104 is similar to movement control for the first focus unit 103. As in the first detection unit 110, the second detection unit 111 detects the position of the second focus unit 104 and outputs a detection result to the lens control unit 105.

The first drive unit 108 and the second drive unit 109 may be actuators other than stepping motors, such as ultrasonic motors and voice coil motors. In such a case, the configurations of the first detection unit 110 and the second detection unit 111 are not limited to the present exemplary embodiment.

Referring back to FIG. 1, the camera body 200 includes the image sensor 201, a signal processing unit 202, a recording processing unit 203, an electronic viewfinder 204, a display unit 205, a defocus detection unit 206, the camera control unit 207, and a memory 208.

The image sensor 201 receives the light from the optical system 101, generates an electrical signal through photoelectric conversion, and outputs the signal to the signal processing unit 202. The image sensor 201 includes pixels for in-focus position detection (not illustrated) in addition to image pickup pixels.

The signal processing unit 202 performs various processing, such as the amplification, noise rejection, and color correction on the input electrical signal and outputs the processed signal to the recording processing unit 203. The recording processing unit 203 records an input image and displays the image on the electronic viewfinder 204 and the display unit 205.

The defocus detection unit (in-focus position detection unit) 206 detects the in-focus state of the subject image by using the image sensor 201. The camera system 10 according to the present exemplary embodiment detects the defocus amount based on the phase difference detection method. The defocus detection unit 206 detects the phase difference between a pair of subject image signals obtained from the light incident via a micro lens for performing pupil division on focus detection pixels of the image sensor 201, determines the defocus amount corresponding to the phase difference, and outputs the defocus amount to the camera control unit 207.

The camera control unit 207, a computer including a central processing unit (CPU), is electrically connected to the defocus detection unit 206, the recording processing unit 203, and the memory 208.

The camera control unit 207 reads a program stored in the memory 208 and then executes the program. The camera control unit 207 also communicates necessary information with the lens control unit 105 in automatic focus control. The camera control unit 207 further generates a driving command to drive the focus unit based on the detection result from the defocus detection unit 206 and the current position of the focus unit acquired from the attached lens apparatus 100. In a case where the lens apparatus 100 is attached to the camera body 200, the position of the focus unit corresponds to the position of the composite focus unit, and the driving command to be generated is one directed for the composite focus unit. The camera control unit 207 repetitively detects the defocus amount and determines the movement amount of the focus unit from when a command for automatic focus control is issued by the user by when a predetermined in-focus state is obtained (until the defocus amount falls at or below a predetermined value).

(Focus Sensitivity)

Figure 12:
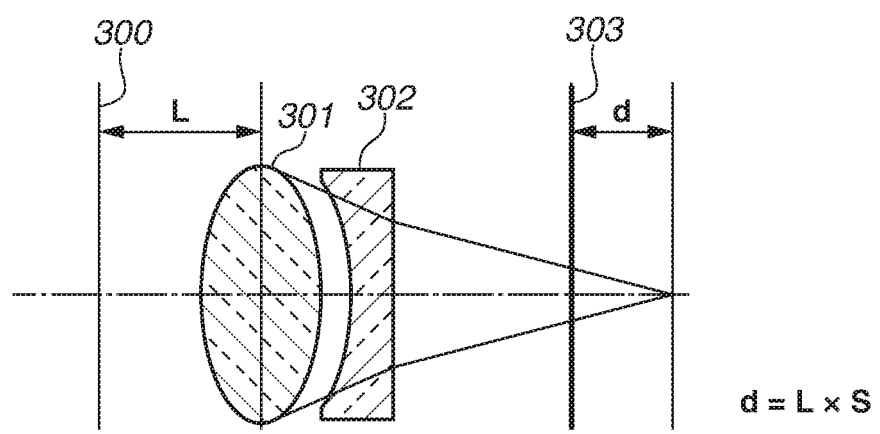
FIG. 12 illustrates a definition of focus sensitivity.

The focus sensitivity will be described below with reference to FIGS. 12, 13A, and 13B. FIG. 12 illustrates the definition of the focus sensitivity.

In the optical system having a focus unit 301 and a fixed unit 302, the relation d=L*S is satisfied, where L denotes a movement amount from a position 300 of the focus unit 301 to the current position of the focus unit 301 in the in-focus state, d denotes the defocus amount, and S denotes the focus sensitivity. More specifically, the focus sensitivity S denotes a variation of the defocus amount d in a unit of the movement amount of the focus unit 301. The defocus amount d is the distance on the optical axis from a light receiving surface 303 of the image sensor 201 to the in-focus position as illustrated in FIG. 12.

Figure 13A:
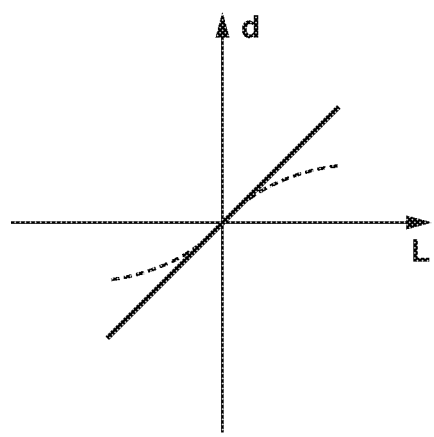
FIGS. 13A and 13B each illustrate focus sensitivity.
Figure 13B:
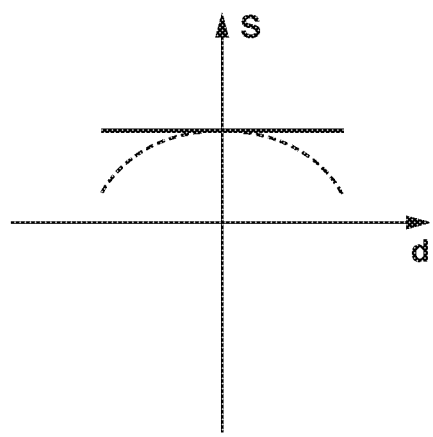

FIG. 13A illustrates the relation between the movement amount L and the defocus amount d. FIG. 13B illustrates the relation between the focus sensitivity S and the defocus amount d.

In a case where the focus sensitivity S remains unchanged with the movement of the focus unit 301, the relation between the defocus amount d and the movement amount L is proportional, as indicated by the solid line, i.e., the focus sensitivity S is constant.

In a case where the focus sensitivity S changes with the movement of the focus unit 301, the focus sensitivity S is represented as a function of the defocus amount d, i.e., S=f(d). When the function f(d) is Talor-expanded, Expansion (1) results. The movement amount L of the focus unit 301 is represented by Expansion (2). These relations are represented by the broken lines illustrated in FIGS. 13A and 13B.

$$S = f(d) = S_0 + S_1 d^1 + S_2 d^2 + \ldots + S_n d^n \qquad (1)$$

$$L = d/S = d/(S_0 + S_1 d^1 + S_2 d^2 + \ldots + S_n d^n) \qquad (2)$$

(Focus Control for Lens Apparatus Having One Focus Unit)

For the comparison with the lens apparatus 100, focus control in a case where the lens apparatus 100 having one focus unit is attached to the camera body 200 will be described below. In the focus unit of this lens apparatus 100, the focus sensitivity S is assumed to change with the position of the focus unit.

In the camera system 10 according to the present exemplary embodiment, the driving command to drive the focus unit indicates the absolute position (hereinafter also referred to as a target position) equivalent to the distance from the photo-interrupter 114 as the reference position to the target position. The absolute position is represented not by the unit of length but by the above-described number of pulses. The number of pulses P corresponding to the defocus amount is represented by Equation 3 where S denotes the focus sensitivity and h denotes the pulse conversion coefficient (movement amount [mm/pulse] of the focus unit per pulse).

$$P = L/h = d/(h*S) \qquad (3)$$

The focus sensitivity S and the pulse conversion coefficient h are values specific to the lens apparatus 100. Thus, to calculate a driving command indicating the target position, it is necessary to add the number of pulses P corresponding to the defocus amount to the current position. Accordingly, the lens apparatus 100 needs to transmit the number of pulses indicating the current position of the focus unit, the focus sensitivity S corresponding to the current position of the focus unit, and the pulse conversion coefficient h to the camera body 200. The camera control unit 207 generates the driving command based on the above-described pieces of information acquired and the defocus amount output from the defocus detection unit 206.

In this case, the number of pulses calculated by Equation 3 may be corrected in consideration of the focus variation accompanying the diaphragm drive and the optical path length between a phase difference sensor and the image pickup surface.

The lens apparatus 100 moves the focusing lens to the target position based on the driving command generated by the camera control unit 207. The lens apparatus 100 repeats the above-described control until by when the defocus amount falls at or below a predetermined value, after moving the focus unit, thus finally focusing the subject.

The lens apparatus 100 may transmit the information indicating the relation between the position of the focus unit and the focus sensitivity to the camera body 200 in advance, and then, the camera control unit 207 may acquire the focus sensitivity S according to the current positions of the focus units.

(Focus Control for Lens Apparatus Having a Plurality of Focus Units)

A description will be provided of focus control in a case where the lens apparatus 100 having a plurality of focus units is attached to the camera body 200 that generates the driving command as described above.

As described above, to reduce the risk of error occurrence due to the system complexity, it is demanded that the camera body 200 is capable of generating the driving command in a similar procedure regardless of the number of focus units included in the lens apparatus 100. Even if the positional relation between the plurality of lens units collapses because any one of the plurality of lens units lags with respect to the target position, it is demanded that the camera system is capable of compensating for the defocus amount variation due to the collapse.

For this reason, the lens apparatus 100 according to the present exemplary embodiment introduces a concept of "composite focus unit". The composite focus unit refers to a single virtual focus unit in which information about the first focus unit 103 and information about the second focus unit 104 are integrated into one. Instead of communicating driving commands to drive the plurality of focus units, the respective positions of the plurality of focus units, and the respective focus sensitivities of the plurality of focus units, the lens apparatus 100 communicates a driving command to drive the composite focus unit, the position of the composite focus unit, and the focus sensitivity of the composite focus unit. More specifically, the lens apparatus 100 has a function of operating, for the camera body 200, as if the lens apparatus 100 has only one focus unit.

The position of the composite focus unit will be described below with reference to FIGS. 3A, 3B, and 4.

Figure 3A:
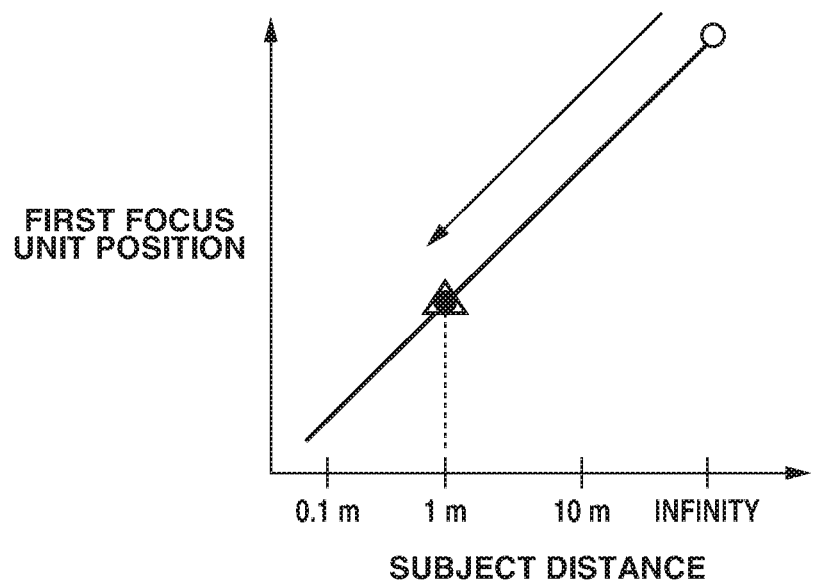
FIGS. 3A and 3B each illustrate a relation between a focus unit position and a subject distance.
Figure 3B:
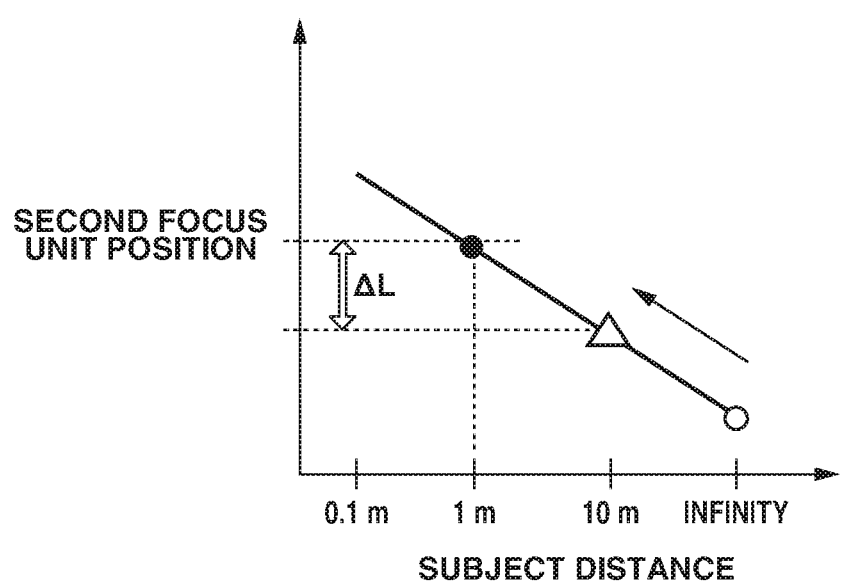

FIGS. 3A and 3B illustrate information indicating the relations between the position of a focus unit and the subject distance stored in memory 106. FIG. 3A illustrates the relation between the position of the first focus unit 103 and the subject distance (first relational information). FIG. 3B illustrates the relation between the position of the second focus unit 104 and the subject distance (second relational information). The horizontal axis represents the subject distance, and the vertical axis represents the positions of the first focus unit 103 in FIG. 3A and the second focus unit 104 in FIG. 3B. The positions of the first focus unit 103 and the second focus unit 104 may be represented by the distance [mm] from the reference position or by the number of pulses corresponding to the position viewed from the reference position.

The target positions for the first focus unit 103 and the second focus unit 104 to obtain a predetermined subject distance are associated with each other on a one-to-one basis. The subject is focused by the first focus unit 103 and the second focus unit 104 being moved to the positions corresponding to respective predetermined subject distances.

Figure 4:
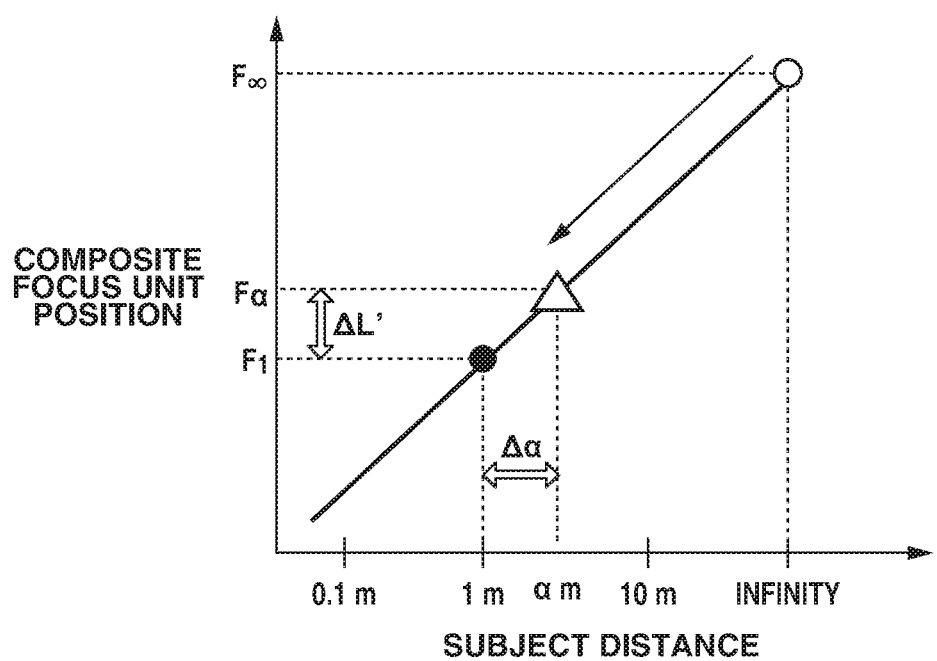
FIG. 4 illustrates a relation between a composite focus unit position and a subject distance.

FIG. 4 illustrates the relation between the position of the composite focus unit and the subject distance stored in the memory 106. The horizontal axis represents the subject distance, and the vertical axis represents the composite focus unit position.

A description will be provided of an example case of changing the state where the subject distance at infinity is in focus to the state where a subject distance of 1 m is in focus. To simplify descriptions, a case where the movement of the second focus unit 104 lags behind the first focus unit 103 will be described below. For example, the lag in movement is caused by a control response lag.

Referring back to FIGS. 3A and 3B, the open circles (○) represent the positions of the first focus unit 103 and the second focus unit 104 when the subject distance is infinity. The filled circles (●) represent the positions of the first focus unit 103 and the second focus unit 104 with a subject distance of 1 m. The open triangles represent the current positions of the first focus unit 103 and the second focus unit 104. Referring to FIG. 4, the open circle (○) represents the position of the composite focus unit when the first focus unit 103 and the second focus unit 104 are positioned at the open circles (○) illustrated in FIGS. 3A and 3B, respectively. The filled circle (●) represents the position of the composite focus unit when the first focus unit 103 and the second focus unit 104 are positioned at the filled circles (●) illustrated in FIGS. 3A and 3B, respectively.

More specifically, FIG. 3A illustrates a state where the current position of the first focus unit 103 has reached the position corresponding to a target subject distance of 1 m, while FIG. 3B illustrates a state where the current position of the second focus unit 104 is the position corresponding to a subject distance of 10 m. In a case where the second focus unit 104 lags by $\Delta L$, as illustrated in FIG. 3B, the subject at a subject distance of 1 m is not in focus because of the lag by $\Delta L$. In practice, the focus is at a subject distance of $\alpha$m. Referring to FIG. 4, $F\alpha$ represents the position of the composite focus unit corresponding to the current subject distance ($\alpha$m).

If all of the plurality of focus units are movable without lagging behind, the lens control unit 105 can transmit the current position of one focus unit (e.g., the first focus unit 103) without change, to the camera control unit 207, as in the lens apparatus 100 having one focus unit. However, since the camera control unit 207 detects the actual defocus amount, the camera control unit 207 recognizes the necessity of a driving command for reducing a deviation $\Delta\alpha$ between a subject distance of 1 m and a subject distance of $\alpha$m. Accordingly, if the lens control unit 105 simply transmits the current position of the first focus unit 103 without taking the lag ΔL into consideration, the camera control unit 207 will further generate a driving command to drive the first focus unit 103 with a position closer to the shortest distance than the target position as the target position, although the first focus unit 103 has already reached the target position.

According to the present exemplary embodiment, the lens control unit 105 acquires the composite focus unit position Fα corresponding to the actual subject distance (αm) as the focus unit position in the lens apparatus 100 in consideration of the lag of the second focus unit 104. More specifically, the composite focus unit position Fα is position information determined in consideration of the current positions of the first focus unit 103 and the second focus unit 104, and is equivalent to the position information about a single position representing the respective positions of the first focus unit 103 and the second focus unit 104. The lens control unit 105 transmits the composite focus unit position Fα to the camera control unit 207.

This configuration enables the camera control unit 207 to generate a driving command with F1 as an absolute position of the target position for the composite focus unit, based on the composite focus unit position Fα and a position lag ΔL corresponding to the subject distance deviation Δα. The lens control unit 105 that has received the driving command moves each of the first focus unit 103 and the second focus unit 104 with the position corresponding to a subject distance of 1 m corresponding to the target absolute position F1 set as the target position. This eliminates the concern that the first focus unit 103 is moved more than necessary, thus enabling only the second focus unit 104 that is lagging behind to be moved to the position corresponding to a subject distance of 1 m.

The lens control unit 105 calculates the composite focus unit position Fα as follows. Let the focus sensitivity of the second focus unit 104, at the current position, stored in the memory 106 be S2. Let the focus sensitivity of the composite focus unit, at the current position, stored in the memory 106 be St. The composite focus sensitivity St is determined by the combination of the positions of the first focus unit 103 and the second focus unit 104. Thus, even with the same subject distance, the composite focus sensitivity may have a different value depending on the combination of the positions of the first focus unit 103 and the second focus unit 104. In such a case, the position Fα is represented by Equation 4.

$$Fα=F1-ΔL'=F1-(ΔL*S2)/St \quad (4)$$

In Equation (4), (ΔL*S2) is an image plane conversion value at the in-focus position resulting from the lag of the second focus unit 104. This is equivalent to the deviation Δα illustrated in FIG. 4. Dividing (ΔL*S2) by the composite focus sensitivity St obtains a deviation amount ΔL' from the target position F1 for the composite focus unit. The lens control unit 105 can calculate the position Fα based on the calculated (ΔL*S2)/St and the position F1.

Since the composite focus unit position is determined in this way, the composite focus unit position can be freely set only by determining the composite focus unit position based on a predetermined definition.

Desirably, the composite focus unit position at a certain subject distance is equalized to the position of one focus unit out of the plurality of focus units with the same subject distance. More desirably, the one focus unit is set to the focus unit having the largest movement amount in focusing from infinity to the shortest distance, out of the plurality of focus units.

For example, according to the present exemplary embodiment, the movement amount of the first focus unit 103 is larger than that of the second focus unit 104, the vertical axis scale indicating the position of the first focus unit 103 illustrated in FIG. 3A is equalized to the vertical axis scale indicating the composite focus unit position illustrated in FIG. 4. More specifically, if the position of the first focus unit 103 at a subject distance of 1 m is represented by 1000 pulses in FIG. 3A, the composite focus unit position at a subject distance of 1 m is also represented by 1000 pulses. Similarly, if the position of the first focus unit 103 at a subject distance at infinity is represented by 3000 pulses, the composite focus unit position at a subject distance of 1 m is also represented by 3000 pulses.

These settings enable the lens control unit 105 to treats the driving command for the composite focus unit (F1=1000 pulses) received from the camera control unit 207 as a driving command for the first focus unit 103 without change. More specifically, the target position for the first focus unit 103 can be set to the position of 1000 pulses. This means that the lens control unit 105 needs to determine only the driving command for the second focus unit 104 by using the information illustrated in FIG. 3B, thus reducing the calculation load.

The resolution of the driving command for the composite focus unit can be ensured by setting the position of the focus unit having the largest movement amount as the composite focus unit position.

In addition, the composite focus unit position at a certain subject distance may be set to a predetermined multiple of the position of a certain focus unit at the same subject distance. An example case will be described in which the vertical axis scale illustrated in FIG. 4 is 1/100 times the vertical axis scale illustrated in FIG. 3A. In this case, when the position of the first focus unit 103 at a subject distance of 1 m is represented by 1000 pulses, the composite focus unit position at a subject distance of 1 m is represented by 10 pulses. Similarly, if the position of the first focus unit 103 at a subject distance at infinity is represented by 3000 pulses, the composite focus unit position at a subject distance at infinity is represented by 30 pulses. If 25 pulses are received as a driving command indicating the target position for the composite focus unit, the lens control unit 105 can recognize the position of 25*100=2500 pulses as the target position for the first focus unit 103.

Although, in the above-described example case, the first focus unit 103 does not lag during movement and only the second focus unit 104 lags during movement, the above-described method is applicable even if both the first focus unit 103 and the second focus unit 104 lag. For example, there arises no problem even if the first focus unit 103 is positioned at the position of 1200 pulses, at a subject distance of 2 m, for a target subject distance of 1 m. Assume that the composite focus unit position Fα corresponding to the current subject distance is represented by 1300 pulses, and that the movement amount ΔL' of the composite focus unit for zeroing the defocus amount is calculated as 300 pulses. In such a case, the camera control unit 207 calculates a driving command indicating the target position for the composite focus unit as 1000 pulses. Accordingly, the target position for the first focus unit 103 is set to 1000 pulses, and thus, the lens control unit 105 further moves the target position by 200 pulses from the current position of 1200 pulses in the direction of the shortest distance.

Detailed focus control according to the present exemplary embodiment will be described below. The driving command indicating the position and the target position is represented by the number of pulses, and the composite focus unit position and the position of the first focus unit 103 at the same subject distance are assumed to be equal in the present exemplary embodiment.

Figure 5:
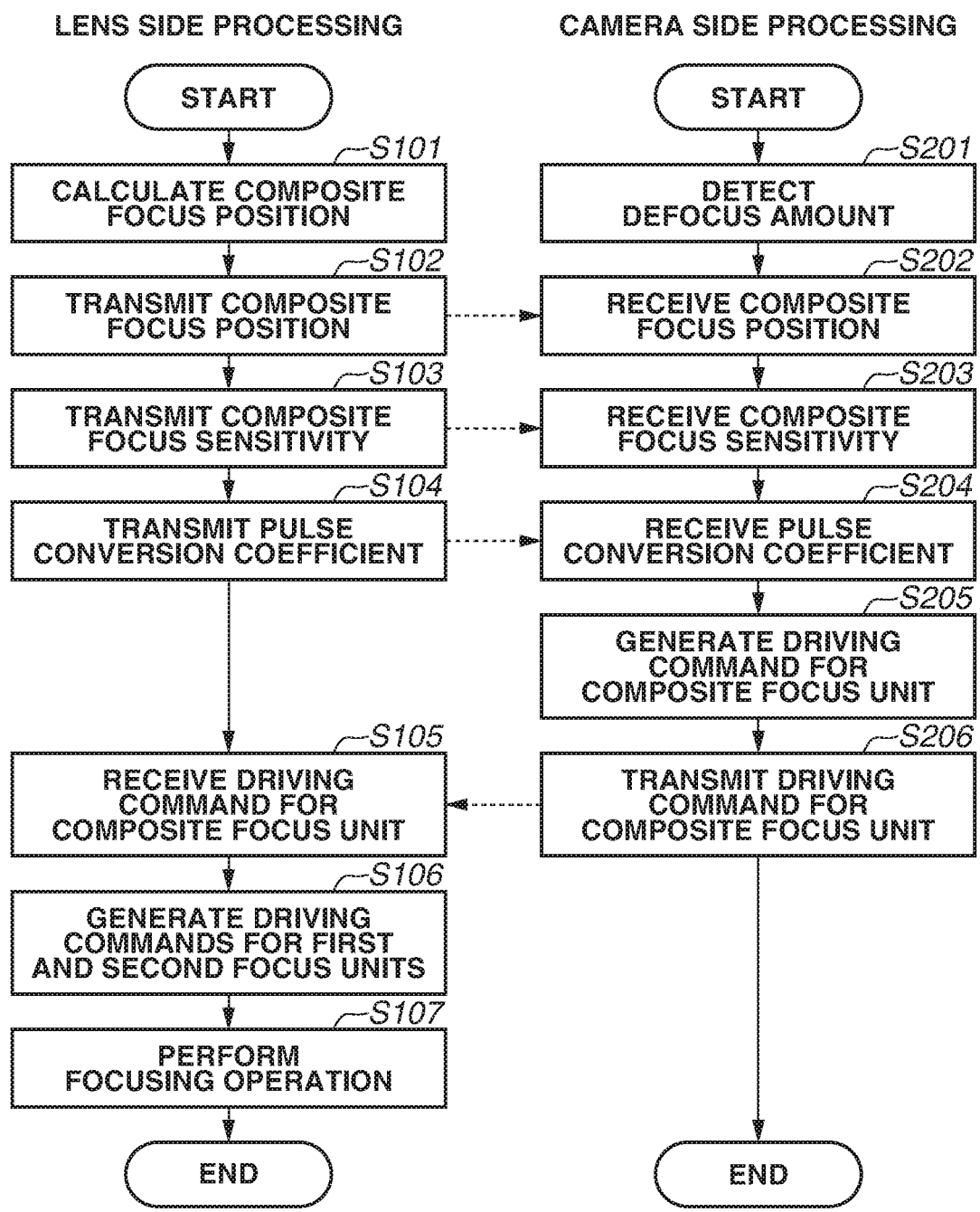
FIG. 5 is a flowchart illustrating focus control according to the first exemplary embodiment.

FIG. 5 is a flowchart illustrating automatic focus control according to the first exemplary embodiment. The lens control unit 105 performs the lens side processing illustrated on the left-hand side of FIG. 5 according to a program read from the memory 106. The camera control unit 207 performs the camera side processing illustrated on the right-hand side of FIG. 5 according to a program read from the memory 208. In the flowcharts and descriptions thereof, the position of the composite focus unit is referred to as a composite focus position, and the focus sensitivity of the composite focus unit is referred to as a composite focus sensitivity. The composite focus sensitivity has been described above.

In step S101, the lens control unit 105 calculates the composite focus position. The calculation method will be described below with reference to FIG. 6.

In step S201, the defocus detection unit 206 detects the defocus amount based on a command from the camera control unit 207.

In step S102, the lens control unit 105 transmits the calculated composite focus position to the camera control unit 207. In step S202, the camera control unit 207 receives the composite focus position.

In step S103, the lens control unit 105 reads the composite focus sensitivity from the memory 106 and transmits the composite focus sensitivity to the camera control unit 207. In step S203, the camera control unit 207 receives the composite focus sensitivity.

In step S104, the lens control unit 105 reads the pulse conversion coefficient from the memory 106 and transmits the pulse conversion coefficient to the camera control unit 207. In step S204, the camera control unit 207 receives the pulse conversion coefficient.

In step S205, the camera control unit 207 generates a driving command indicating the target absolute position for the composite focus unit based on the defocus amount detected by the defocus detection unit 206, the composite focus position, the composite focus sensitivity, and the pulse conversion coefficient.

In step S206, the camera control unit 207 transmits the driving command generated in step S205 to the lens control unit 105. In step S105, the lens control unit 105 receives the driving command. Since the received driving command is only one driving command for the composite focus unit, the lens control unit 105 cannot control the positions of the first focus unit 103 and the second focus unit 104 with the driving command unchanged.

Thus, in step S106, the lens control unit 105 generates a driving command for each of the first focus unit 103 and the second focus unit 104 based on the driving command for the composite focus unit received in step S105. In such a case, according to the present exemplary embodiment, since the composite focus unit position and the position of the first focus unit 103 at the same subject distance are equal, the absolute position indicated by the driving command for the composite focus unit serves as the target absolute position for a driving command for the first focus unit 103. The position of the second focus unit 104 at the subject distance corresponding to the driving command for the composite focus unit (driving command for the first focus unit 103) serves as the target absolute position for the driving command for the second focus unit 104.

In step S107, the lens control unit 105 drives the first drive unit 108 and the second drive unit 109 based on the two driving commands generated in step S106. Thus, the lens control unit 105 performs a focusing operation by the movement of the first focus unit 103 and the second focus unit 104.

As described above, the lens side processing and the camera side processing in focus control are performed. The operations in steps S101 to S107 and operations steps S201 to S206 are repetitively executed until a result of the defocus amount detection falls at or below a predetermined value.

The order in which the lens control unit 105 transmits the composite focus position, the composite focus sensitivity, and the pulse conversion coefficient to the camera control unit 207 is not limited to the transmission order illustrated in the flowchart illustrated in FIG. 5.

Figure 6:
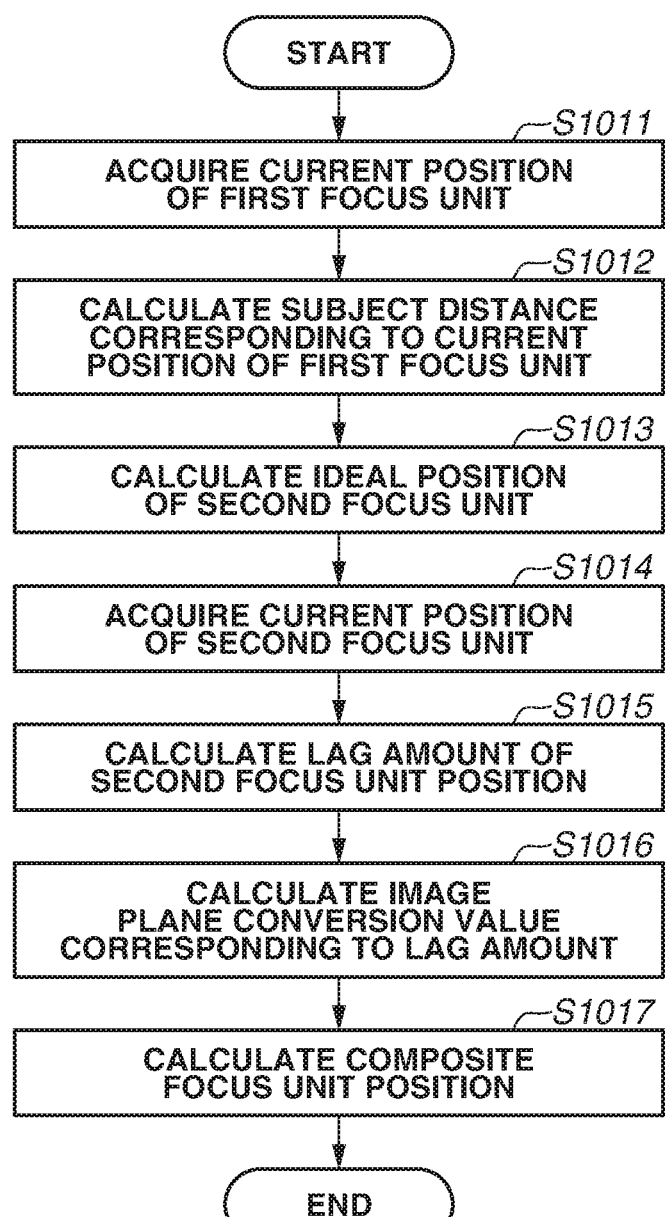
FIG. 6 is a flowchart illustrating a method for calculating a composite focus position according to the first exemplary embodiment.

The operation in step S101 illustrated in FIG. 5 will be described in detail below with reference to FIG. 6. FIG. 6 is a flowchart illustrating the method for calculating the composite focus position according to the first exemplary embodiment. This flowchart illustrates the calculation process of the above-described Equation 4. The lens control unit 105 reads a program for executing the processing of the flowchart from the memory 106 and then executes the program.

In step S1011, the lens control unit 105 acquires the current position of the first focus unit 103 with the first detection unit 110.

In step S1012, the lens control unit 105 calculates the subject distance corresponding to the current position by using the information illustrated in FIG. 3A based on the current position of the first focus unit 103 acquired in step S1011.

In step S1013, the lens control unit 105 calculates the ideal position of the second focus unit 104 at the subject distance calculated in step S1012 by using the information illustrated in FIG. 3B.

In step S1014, the lens control unit 105 acquires the current position of the second focus unit 104 with the second detection unit 111.

In step S1015, the lens control unit 105 calculates the lag amount of the position of the second focus unit 104. The lag amount is equivalent to a difference between the ideal position of the second focus unit 104 calculated in step S1013 and the current position of the second focus unit 104 acquired in step S1014.

In step S1016, the lens control unit 105 calculates an image plane conversion value corresponding to the lag amount calculated in step S1015. The image plane conversion value corresponding to the lag amount is equivalent to a difference between the in-focus position when the second focus unit 104 does not lag and the in-focus position when the second focus unit 104 lags. In other words, the image plane conversion value is equivalent to the above-described subject distance deviation $\Delta\alpha$. Here, the lens control unit 105 calculates the image plane conversion value corresponding to the lag amount by multiplying the lag amount calculated in step S1015 by the focus sensitivity of the second focus unit 104 alone.

In step S1017, the lens control unit 105 calculates the composite focus position based on the image plane conversion value calculated in step S1016, the composite focus sensitivity, and the position of the first focus unit 103 acquired in step S1011.

This completes the description of the method for calculating the composite focus position. The operation of the processing in step S1014 needs to be performed before the operation in step S1015 and is not limited to the timing in the flowchart illustrated in FIG. 6.

Thus, the lens control unit 105 acquires the composite focus unit position as a result of combining the positions of the plurality of focus units into one, and controls the positions of the plurality of focus units based on the driving command determined based on the composite focus unit position. The lens control unit 105 and the camera control unit 207 handle only information about the composite focus unit. This enables the camera control unit 207 to generate a driving command without changing the calculation processing depending on the number of focus units included in the lens apparatus 100 attached to the camera body 200. Restraining the complexity in calculation processing and communication provides the camera system 10 in which errors are less likely to occur.

In addition, the lens control unit 105 calculates the composite focus unit position corresponding to the current in-focus position as the composite focus unit position required for the camera control unit 207 to generate a driving command. Even if the movement of the first focus unit 103 and/or the second focus unit 104 lags, the above-described calculation controls the positions thereof based on driving commands with the lag compensated.

(Camera System Configuration)

Figure 7:
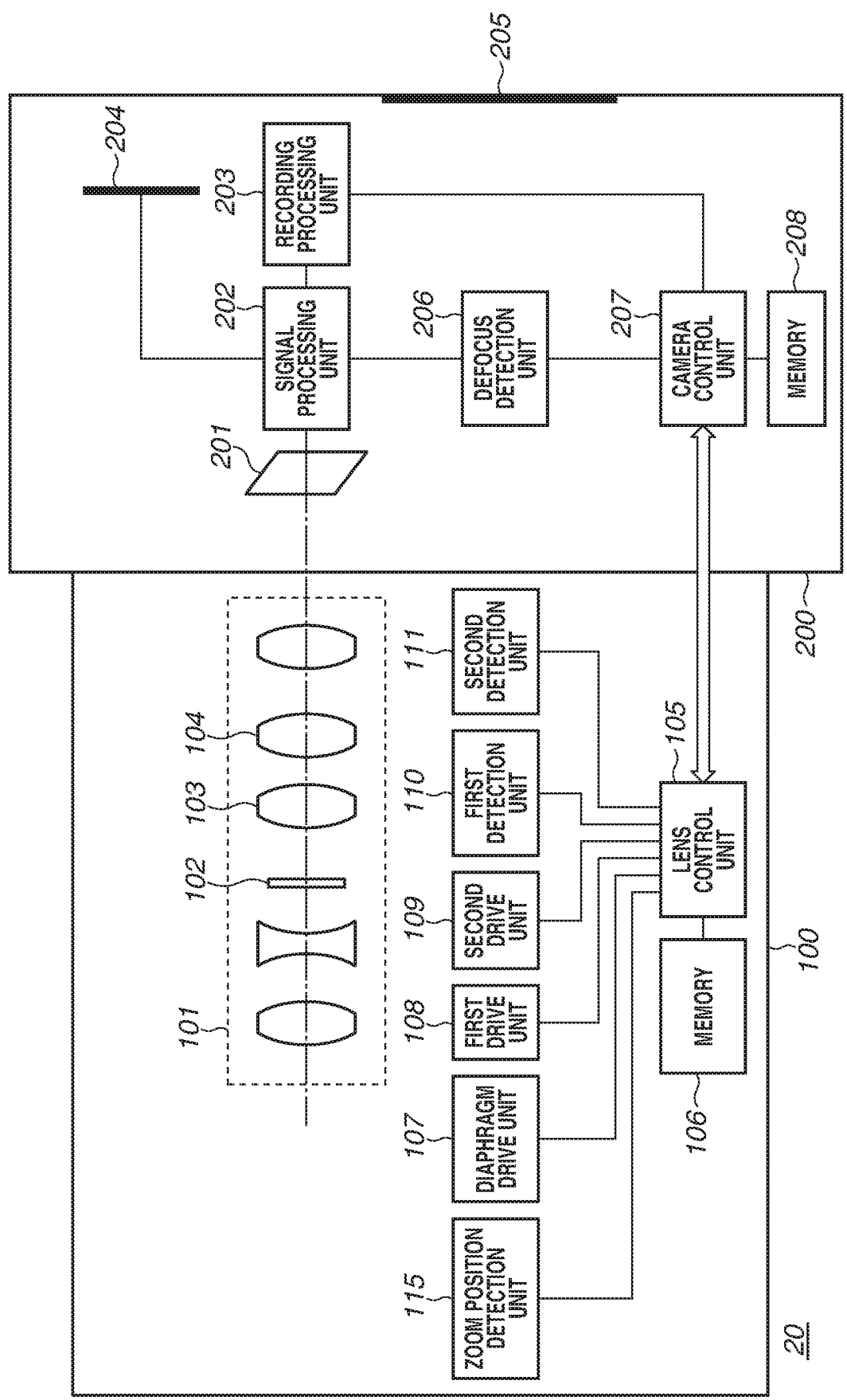
FIG. 7 illustrates a configuration of a camera system according to a second exemplary embodiment.

A second exemplary embodiment of the present invention will be described below. FIG. 7 illustrates a configuration of a camera system 20 according to the present exemplary embodiment. Unlike the optical system 101 of the camera system 10 as a fixed focal length lens, the optical system 101 of the camera system 20 is a zoom lens having a lens unit that moves in zooming.

The lens unit is mechanically connected to an operation unit (not illustrated) provided on the lens apparatus 100, and moves along the optical axis of the optical system 101 according to the operation amount and operation direction performed on the operation unit.

The lens apparatus 100 includes a zoom position detection unit 115 for detecting the position of the lens unit to grasp the zoom position (the focal distance of the optical system 101). The zoom position detection unit 115 outputs the detected position of the lens unit to the lens control unit 105.

The memory 106 stores information indicating the relation between the zoom position and the focus unit position for each subject distance (described below with reference to FIGS. 8A and 8B). The memory 106 further stores information indicating the relation between the zoom position and the composite focus unit position for each subject distance (described below with reference to FIGS. 9A and 9B), and information for normalizing the zoom positions for the information.

The focus sensitivity S changes not only by the focus unit position but also by the zoom position. Thus, the memory 106 stores the focus sensitivity of the composite focus unit for the respective positions of the first focus unit 103 and the second focus unit 104 for each zoom position. The memory 106 stores the focus sensitivity for each zoom position and for each position of the first focus unit 103, and the focus sensitivity for each zoom position and each position of the second focus unit 104.

Other configurations of the camera system 20 are similar to those of the camera system 10, and duplicated descriptions thereof will be omitted.

(Focus Control by Zoom Lens)

The optical system 101 is capable of maintaining the in-focus state on a certain subject by changing the positions of the first focus unit 103 and the second focus unit 104 with a change in the zoom position.

FIGS. 8A and 8B illustrate the relations between the zoom position, the focus unit positions, and the subject distance. FIG. 8A illustrates the relation for the first focus unit 103, and FIG. 8B illustrates the relation for the second focus unit 104. The horizontal axis is assigned the zoom position, and the vertical axis is assigned each focus unit position. The curve drawn by a single solid line represents the relation between the zoom position and each focus unit position required to maintain the same subject distance. The memory 106 stores the curves corresponding to the plurality of representative subject distances. The curve related to a subject distance other than infinity, 10 m, 1 m, and 0.1 m can be calculated by internally dividing the interval between the two curves corresponding to the subject distance closest to the subject distance according to the subject distance of the curve to be obtained. The target position for each focus unit at each zoom position can be calculated based on the obtained curve. While an example using a curve is described here, the memory 106 may store data about representative points with which these curves can be drawn through approximation.

(Method for Controlling a Plurality of Focus Units)

A control method using a plurality of focus units will be described below for a case of a target subject distance of 1 m, with reference to FIGS. 8A, 8B, 9A, and 9B.

In the lens apparatus 100, the lens control unit 105 communicates information about the composite focus unit position, the composite focus sensitivity, and a driving command for the composite focus unit with the camera control unit 207, as in the first exemplary embodiment. More specifically, the lens apparatus 100 has the function of operating, for the camera body 200, as if the lens apparatus 100 has one focus unit.

Figure 9A:
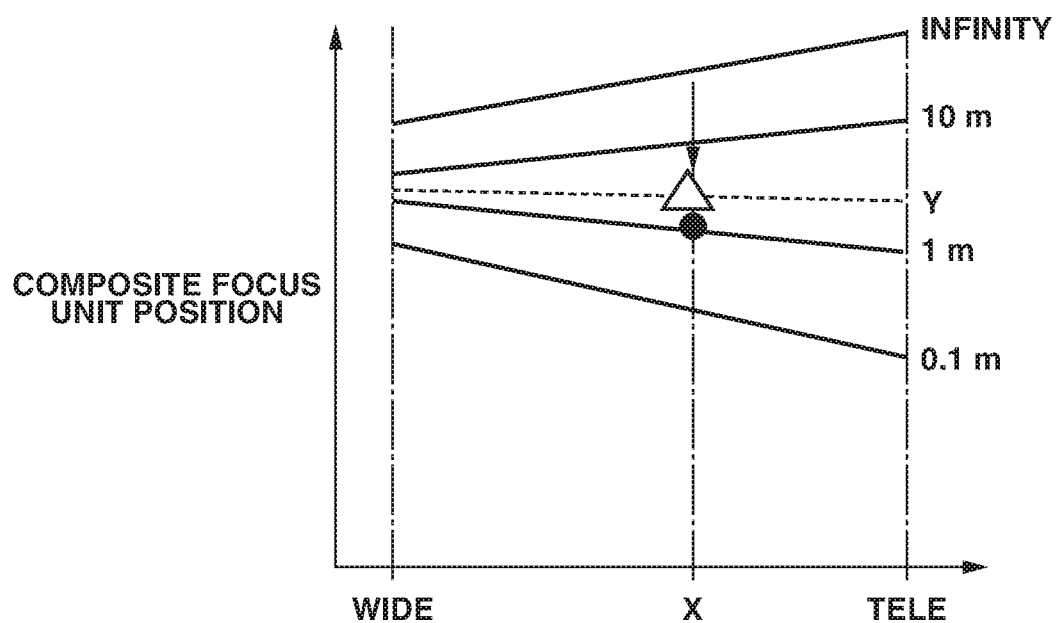
FIGS. 9A and 9B each illustrate a relation between a zoom position and a composite focus unit position for each subject distance.
Figure 9B:
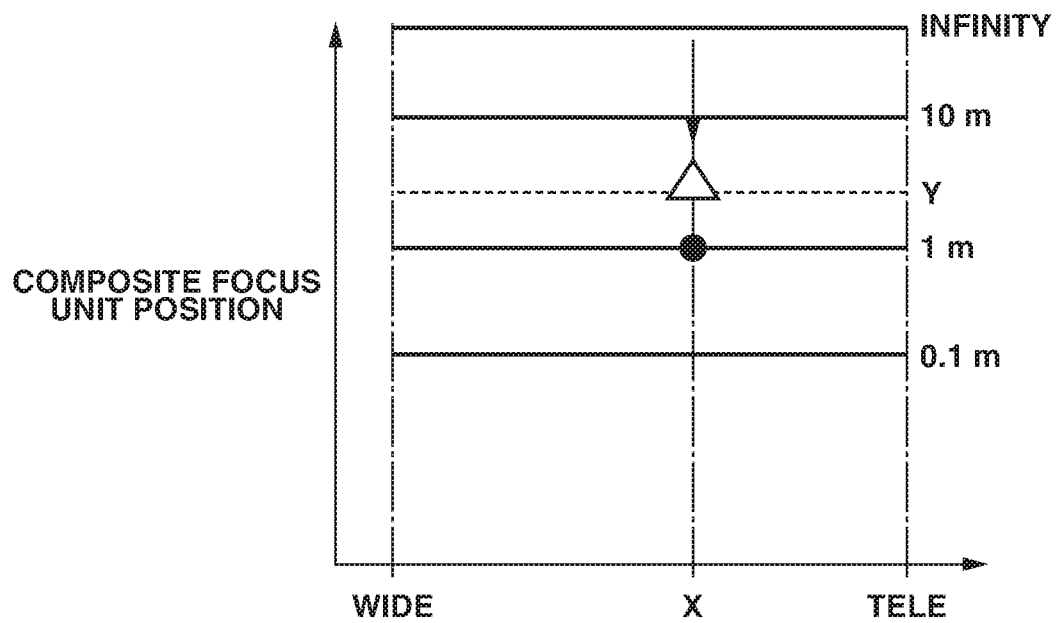

FIGS. 9A and 9B illustrate the relations between the zoom position and the composite focus position for each subject distance. FIG. 9A illustrates a case where the zoom positions are not normalized, and FIG. 9B illustrates a case where the zoom positions are normalized. In a case where zooming is performed while the camera control unit 207 is generating a driving command, the camera control unit 207 cannot grasp the zoom position variation. Thus, the camera control unit 207 cannot grasp the movement of the first focus unit 103 and the second focus unit 104 accompanying the zooming. Thus, for the lens control unit 105 to behave as if the first focus unit 103 and the second focus unit 104 remain unchanged according to change in the zoom position, the zoom positions are normalized as illustrated in FIG. 9B. To simplify the description, a case will be described where the zoom positions are normalized at the positions where the composite focus unit positions are at TELE (telephoto end). The zoom position normalization is discussed in detail in Japanese Patent Application Laid-Open No. 2014-178639.

The zoom position normalization is not limited to a case where the zoom positions are normalized at the composite focus unit positions when the zoom positions are at TELE. If the normalized composite focus unit position can be calculated backwards to the original composite focus unit position, the zoom positions may be normalized at the composite focus unit positions when the zoom positions are at WIDE (wide-angle end) or at intermediate positions, or by using other methods.

Referring now to FIGS. 8A and 8B, the filled circles (●) indicate the target positions for the first focus unit 103 and the second focus unit 104 for focusing on a subject distance of 1 m at the zoom position X, respectively. The open triangles indicate the current positions for focusing on the first focus unit 103 and the second focus unit 104, respectively. Referring to FIGS. 9A and 9B, the filled circles (●) indicate the target positions for the composite focus unit for focusing on a subject distance of 1 m at the zoom position X. The open triangles indicate the current positions of the composite focus unit.

In the lens apparatus 100, the lens control unit 105 calculates the current subject distance based on the current positions of the first focus unit 103 and the second focus unit 104 and calculates the composite focus unit position corresponding to the calculated subject distance. The camera control unit 207 then generates a driving command for causing the composite focus unit to reach a subject distance of 1 m by using the composite focus unit position, the focus sensitivity of the composite focus unit, and the pulse conversion coefficient acquired from the lens apparatus 100. According to the second exemplary embodiment, the camera control unit 207 generates the number of pulses indicating the target absolute position for the composite focus unit as a driving command, as in the first exemplary embodiment.

An automatic focus control method according to the second exemplary embodiment will be described in detail below with reference to FIGS. 10 and 11.

Figure 10:
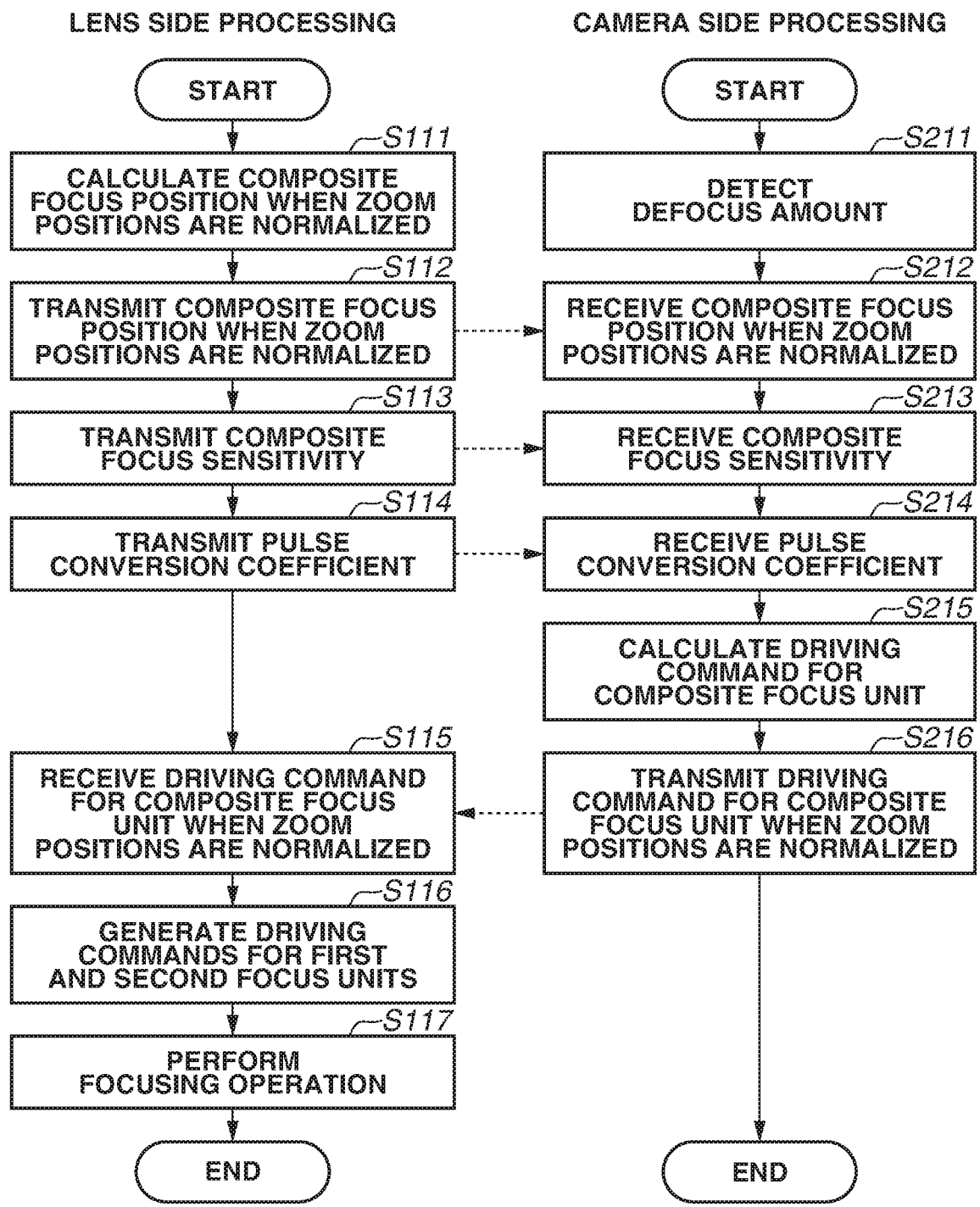
FIG. 10 is a flowchart illustrating focus control according to the second exemplary embodiment.
Figure 11:
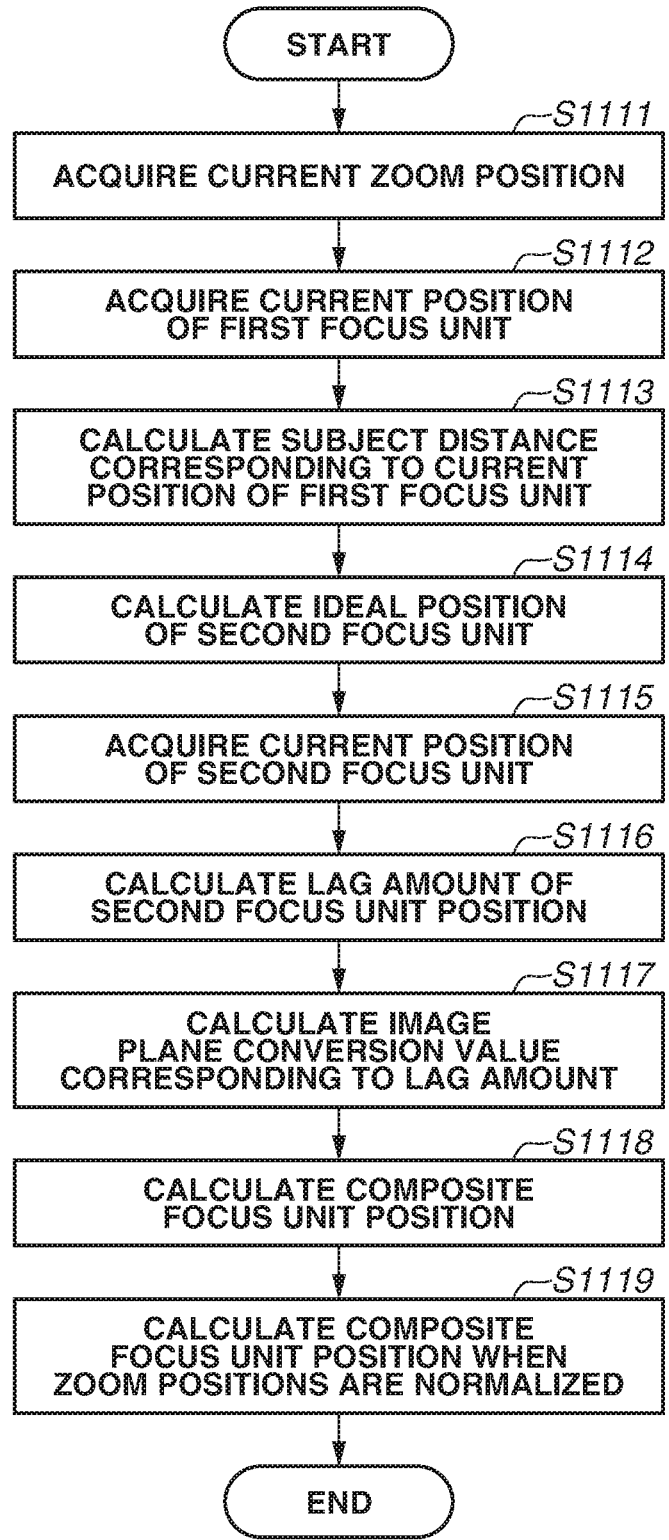
FIG. 11 is a flowchart illustrating a method for calculating a composite focus position according to the second exemplary embodiment.

FIG. 10 is a flowchart illustrating the automatic focus control according to the second exemplary embodiment. The lens control unit 105 performs the lens side processing illustrated on the left-hand side of FIG. 10 according to a program read from the memory 106. The camera control unit 207 performs the camera side processing illustrated on the right-hand side of FIG. 10 according to a program read from the memory 208.

Operations in steps S111 to S115 correspond to operations in steps S101 to S105, respectively, and operations in steps S211 to S216 correspond to operations in steps S201 to S206, respectively.

These operations differ from those according to the first exemplary embodiment in that the composite focus position is handled as a value when the zoom positions are normalized, and the composite focus sensitivity is handled as the focus sensitivity corresponding to the composite focus position when the zoom positions are normalized. In addition, the information transmitted from the camera control unit 207 in step S216 and then received by the lens control unit 105 in step S115 is a driving command for the composite focusing lens unit when the zoom positions are normalized.

In step S116, the lens control unit 105 generates a driving command for the first focus unit 103 and a driving command for the second focus unit 104. To generate a driving command for each of the first focus unit 103 and the second focus unit 104, based on the information received in step S115, the lens control unit 105 generates a driving command for the first focus unit 103 and a driving command for the second focus unit 104 in a state where the zoom positions are normalized. The lens control unit 105 then converts the driving commands into the positions corresponding to the current zoom position, thus generating a driving command for the first focus unit 103 and a driving command for the second focus unit 104.

For example, a case will be described where <position of the first focus unit 103 at zoom position X with a subject distance of 1 m>/<position of the first focus unit 103 at TELE> is 9/10 in FIG. 8A. In such a case, the lens control unit 105 multiplies the number of pulses as a driving command for the first focus unit 103 when the zoom positions are normalized, by 10/9, thus obtaining the target absolute position for the first focus unit 103 at the current zoom position.

In step S117, the lens control unit 105 drives the first drive unit 108 and the second drive unit 109 based on the two driving commands generated in step S116, thus performing a focusing operation by the first focus unit 103 and the second focus unit 104.

The lens side processing and the camera side processing in the focus control are performed in this way.

The order in which the lens control unit 105 transmits the composite focus position, the composite focus sensitivity, and the pulse conversion coefficient to the camera control unit 207 is not limited to the transmission order described in the flowchart illustrated in FIG. 10.

The processing in step S111 illustrated in FIG. 10 will be described in detail below with reference to FIG. 11. FIG. 11 is a flowchart illustrating the method for calculating the composite focus position according to the second exemplary embodiment. The lens control unit 105 reads a program for executing the processing of the flowchart from the memory 106 and then executes the program.

In step S1111, the lens control unit 105 acquires the current zoom position with the zoom position detection unit 115.

In step S1112, the lens control unit 105 acquires the current focus position of the first focus unit 103 via the first detection unit 110.

In step S1113, based on the current zoom position acquired in step S1111 and the current position of the first focus unit 103 acquired in step S1112, the lens control unit 105 calculates the subject distance corresponding to the current position by using the information illustrated in FIG. 8A.

Operations in steps S1114 to S1118 are almost similar to the above-described operations in steps S1013 to S1017, respectively, and detailed descriptions thereof will be omitted. However, unlike the first exemplary embodiment, in step S113, the lens control unit 105 transmits, as the focus sensitivity, the focus sensitivity corresponding to the zoom position normalization to the camera control unit 207.

In step S1119, the lens control unit 105 calculates the composite focus unit position when the zoom positions are normalized, based on the composite focus unit position calculated in step S1118. In such a case, the lens control unit 105 normalizes the composite focus unit position in the entire zoom range in terms of the composite focus position at TELE (telephoto end) for the same subject distance. This completes the description of the processing included in step S111.

The present exemplary embodiment produces effects similar to the first exemplary embodiment. More specifically, the camera control unit 207 can generate a driving command without changing the calculation processing depending on the number of focus units included in the lens apparatus 100 attached to the camera body 200, making it possible to configure the camera system 10 in which error are less likely to occur.

Even in a case where the movement of a certain focus unit lags, the lens control unit 105 can control the positions based on a driving command with the lag compensated, by calculating the composite focus unit position corresponding to the current in-focus position.

In addition, in a case where the lens apparatus 100 is a zoom lens, the lens control unit 105 applies normalization processing to the zoom positions. Thus, even if the camera control unit 207 cannot grasp the zoom position, the camera control unit 207 can perform focus control without changing the calculation processing according to the type of the optical system 101 (fixed focal length lens or zoom lens).

A third exemplary embodiment of the present invention will be described below. The first and the second exemplary embodiments have been described above centering on a case where the driving command specifies the number of pulses indicating the target absolute position. In the present exemplary embodiment, the driving command specifies the number of pulses indicating a movement amount required for a movement from the current position to the target position. In other words, the driving command according to the third exemplary embodiment specifies the number of pulses indicating a relative position with reference to the current position.

Differences from the processing according to the first exemplary embodiment illustrated in FIG. 5 will be described below.

In step S101, the lens control unit 105 calculates the composite focus position through processing similar to the first exemplary embodiment. The composite focus position calculated here is to be used by the lens control unit 105 to perform calculation afterwards, and therefore does not need to be transmitted to the camera control unit 207 as in step S102. According to the third exemplary embodiment, the information to be transmitted from the lens control unit 105 to the camera control unit 207 may include only the composite focus sensitivity and the pulse conversion coefficient.

The third exemplary embodiment differs from the first exemplary embodiment in the operations in steps S205 and S106.

In step S205, the camera control unit 207 calculates a driving command based on the defocus amount detected by the defocus detection unit 206 and the composite focus sensitivity and the pulse conversion coefficient acquired from the lens control unit 105. The driving command to be calculated here specifies the number of pulses indicating the movement amount of the composite focus unit required to zero the defocus amount, more specifically, the number of pulses indicating a relative position with respect to the current position. In step S206, the camera control unit 207 transmits this driving command. In step S105, the lens control unit 105 receives the driving command.

In step S106, the lens control unit 105 controls the positions of the first focus unit 103 and the second focus unit 104 based on the received driving command and the composite focus position calculated in step S101.

In this case, the lens control unit 105 determines the number of pulses indicating the target absolute position for the composite focus unit from the received driving command. For example, assume that the composite focus unit position corresponding to the current subject distance (αm) is represented by 1300 pulses, and the lens control unit 105 has received −300 pulses as a driving command from the camera control unit 207. In such a case, the target absolute position for the composite focus unit is calculated as 1300−300=1000 pulses.

After calculating the target absolute position, the lens control unit 105 calculates the number of pulses indicating the target absolute positions for the first focus unit 103 and the second focus unit 104 by using the information illustrated in FIGS. 3A, 3B, and 4 and then executes step S107, as in the first exemplary embodiment.

In this way, the present invention produces effects similar to the first exemplary embodiment even in a case where a driving command indicates the movement amount required to reach the target absolute position.

If the driving command includes information indicating whether the driving command is the target position or the movement amount to reach the target position, a driving command of a different type may be transmitted at a different timing depending on the status of the camera control unit 207.

A fourth exemplary embodiment of the present invention will be described below. According to the first exemplary embodiment, the defocus detection unit 206 detects the defocus amount based on the phase difference detection method. According to the present exemplary embodiment, the defocus detection unit 206 detects a contrast value based on image signals generated by the image sensor 201 and the signal processing unit 202. Automatic focus control by detecting the contrast value is referred to as contrast automatic focusing (AF). In contrast AF, the defocus detection unit 206 detects the contrast value while moving the focus unit at a constant speed from end to end of the movable range and detects the focus unit position when the contrast value reaches the peak as the position in the in-focus state. The lens control unit 105 then moves again the focus unit having reached the end of the movable range, with the position in the in-focus state as the target absolute position, to perform focusing.

In contrast AF, the fourth exemplary embodiment differs from the first exemplary embodiment also in the calculation processing which is performed by the camera control unit 207 to generate a driving command Other configurations are similar to those of the camera system 10, and detailed descriptions thereof will be omitted.

In contrast AF, the camera control unit 207 transmits the driving command to the lens control unit 105, and the lens control unit 105 moves the first focus unit 103 and the second focus unit 104 at predetermined speeds over the entire movable range. While the first focus unit 103 and the second focus unit 104 are being scanned, the defocus detection unit 206 outputs a contrast value to the camera control unit 207 at a fixed timing. The lens control unit 105 transmits the composite focus position to the camera control unit 207 at predetermined intervals.

The camera control unit 207 determines the composite focus unit position where the contrast value peaks, based on the output from defocus detection unit 206. The peak may be determined by interpolation. The camera control unit 207 then determines the composite focus unit position when the current contrast value peaks, as a driving command for the composite focus unit, and transmits the driving command to the lens control unit 105. The method through which the lens control unit 105 determines the composite focus unit position and the processing in which the lens control unit 105 receives a driving command are similar to those according to the first exemplary embodiment.

The present exemplary embodiment produces effects similar to those of the first and the second exemplary embodiments even in a case where the driving command for the composite focus unit is generated based on a result of the contrast detection.

Other Exemplary Embodiments

As other exemplary embodiments, the following modifications may be applied to the first to the fourth exemplary embodiments.

While the number of pulses corresponding to the target position is used as the driving command in the above-described exemplary embodiments, the method for representing the driving command according to the present invention is not limited thereto. For example, the distance [mm] from the reference position and the movement amount [mm] from the current position to the target position may be used as a driving command. Alternatively, an electrical signal to be applied to an actuator by when the target position is reached may be used as a driving command. The information about the composite focus unit position generated by the lens control unit 105 is not limited to the number of pulses, and may be represented by the distance from the reference position.

The number of focus units included in the lens apparatus 100 is not limited to two, and may be three or more. Even when the lens apparatus 100 includes three or more focus units, the lens control unit 105 is capable of calculating one composite focus unit position based on the respective positions and the respective focus sensitivities of all focus units. The lens apparatus 100 transmits the composite focus position and the composite focus sensitivity to the camera control unit 207, and thus, the camera control unit 207 can generate a driving command for the composite focus unit.

The information to be transmitted from the lens control unit 105 to the camera control unit 207 is not limited to the focus sensitivity of the composite focus unit, and may be other information as long as the information is focus sensitivity information with which the focus sensitivity can be calculated by the camera control unit 207. For example, if the camera control unit 207 recognizes that the focus sensitivity is represented by Expansion (1), the lens control unit 105 may transmit the coefficient for each term ($S_0$, $S_1$, . . . ) as the focus sensitivity information to the camera control unit 207. However, one set of coefficients for calculating one focus sensitivity is treated as one piece of focus sensitivity information.

While the present invention has specifically been described based on the above-described exemplary embodiments, the present invention is not limited thereto but can be modified and changed in diverse ways within the ambit of the appended claims.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed comput- ing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-101783, filed May 30, 2019, which is hereby incorporated by reference herein in its entirety.

What is claimed is:

1. A lens apparatus attachable to and detachable from a camera body, the lens apparatus comprising:
   an optical system including a plurality of lens units configured to move in adjusting an in-focus state of a subject image;
   a detection unit configured to detect respective positions of the plurality of lens units;
   at least one processor; and
   a memory coupled to the at least one processor, the memory having instructions that, when executed by the processor, performs operations as:
   an acquisition unit configured to acquire, based on the positions of the plurality of lens units detected by the detection unit and relational information indicating a relation between a position of each of the plurality of lens units and a subject distance, position information regarding a single position representing positions of the plurality of lens units corresponding to a current subject distance; and
   a control unit configured to control positions of the plurality of lens units based on the position information,
   wherein the acquisition unit calculates a deviation from a target subject distance resulting from a lag in movement of at least one of the plurality of lens units, and determines the current subject distance based on the deviation.

2. The lens apparatus according to claim 1,
   wherein the plurality of lens units includes a first lens unit and a second lens unit, and
   wherein the acquisition unit calculates the deviation, based on a focus sensitivity and a difference between a position of the second lens unit detected by the detection unit and a position of the second lens unit obtained based on a position of the first lens unit detected by the detection unit and the relational information, the focus sensitivity being based on a position of the second lens.

3. The lens apparatus according to claim 1,
   wherein the relational information is first relational information, and
   wherein, in acquiring the position information corresponding to the current subject distance, second relational information indicating a relation between the subject distance and the position information of a virtual composite lens unit that integrate the plurality of lens units into one is used.

4. The lens apparatus according to claim 1, wherein the processor further performs operations as a determination unit configured to determine respective driving commands to drive each of the plurality of lens units based on a driving command received from the camera body.

5. The lens apparatus according to claim 4, wherein the determination unit determines respective driving commands to drive each of the plurality of lens units based on the driving command received from the camera body and the relational information.

6. The lens apparatus according to claim 1, wherein, for the same subject distance, the position information is identical to position information about a position of one lens unit in the relational information about the one lens unit among the plurality of lens units indicated by the relational information.

7. The lens apparatus according to claim 6, wherein the one lens unit is a lens unit having a larger movement amount in adjusting the in-focus state from infinity to the shortest distance among the plurality of lens units.

8. A lens apparatus attachable to and detachable from a camera body, the lens apparatus comprising:
an optical system including a plurality of lens units configured to move in adjusting an in-focus state of a subject image;
a detection unit configured to detect respective positions of the plurality of lens units;
at least one processor; and
a memory coupled to the at least one processor, the memory having instructions that, when executed by the processor, performs operations as:
an acquisition unit configured to acquire, based on the respective positions of the plurality of lens units detected by the detection unit and relational information indicating a relation between a subject distance and the respective positions of the plurality of lens units, position information regarding a single position representing the respective positions of the plurality of lens units corresponding to a current subject distance;
a communication unit configured to transmit, to the camera body, one piece of focus sensitivity information determined from the respective positions of the plurality of lens units detected by the detection unit; and
a control unit configured to control the respective positions of the plurality of lens units based on the position information.

9. The lens apparatus according to claim 8,
wherein the communication unit transmits the position information corresponding to the current subject distance to the camera body,
wherein the processor further performs operations as a communication unit configured to receive a driving command that the camera body generates using the position information corresponding to the current subject distance and the focus sensitivity information and indicates a target absolute position, and
wherein the control unit is configured to control the positions of the plurality of lens units based on the driving command.

10. The lens apparatus according to claim 8,
wherein the communication unit is configured to receive a driving command that the camera body generates using the focus sensitivity information and indicates a movement amount to a target absolute position, and
wherein the control unit is configured to control the positions of the plurality of lens units based on the position information corresponding to the current subject distance and the driving command.

11. The lens apparatus according to claim 8,
wherein the optical system is a zoom lens for moving the plurality of lens units such that the in-focus state for a certain subject is maintained in zooming, and
wherein, as the position information, the communication unit transmits position information in which a zoom position is normalized to the camera body.

12. The lens apparatus according to claim 8,
wherein the optical system is a zoom lens for moving the plurality of lens units such that the in-focus state for a certain subject is maintained in zooming, and
wherein, as the focus sensitivity information, the communication unit transmits, to the camera body, focus sensitivity information corresponding to zoom position normalization.

13. The lens apparatus according to claim 8, wherein, in a case where the camera body detects the in-focus state based on a contrast of the subject image captured using an image sensor, a communication unit is configured to transmit the position information corresponding to the current subject distance to the camera body at predetermined intervals.

14. A camera which the lens apparatus according to claim 1 is attachable to and detachable from, the camera comprising:
at least one processor; and
a memory coupled to the at least one processor, the memory having instructions that, when executed by the processor, performs operations as:
a generation unit configured to generate a driving command for the lens apparatus based on the position information being acquired from the lens apparatus.

15. A non-transitory computer-readable storage medium storing instructions that, when executed by a computer of a lens apparatus attachable to and detachable from a camera, cause the computer to perform a control method comprising:
detecting respective a position of each of a plurality of lens units configured to move in adjusting an in-focus state of a subject image;
acquiring, based on the detected positions of the plurality of lens units and relational information indicating a relation between a subject distance a position of each of the plurality of lens units, position information about a single position representing positions of the plurality of lens units corresponding to a current subject distance; and
controlling positions of the plurality of lens units based on the position information,
wherein, in the acquiring the position information, calculates a deviation from a target subject distance resulting from a lag in movement of at least one of the plurality of lens units, and determines the current subject distance based on the deviation.

16. A camera which the lens apparatus according to claim 8 is attachable to and detachable from, the camera comprising:
at least one processor; and
a memory coupled to the at least one processor, the memory having instructions that, when executed by the processor, performs operations as:
a generation unit configured to generate a driving command for the lens apparatus based on the position information acquired from the lens apparatus.

17. A non-transitory computer-readable storage medium storing instructions that, when executed by a computer of a lens apparatus attachable to and detachable from a camera, cause the computer to perform a control method comprising:
detecting respective a position of each of a plurality of lens units configured to move in adjusting an in-focus state of a subject image;

acquiring, based on the detected positions of the plurality of lens units and relational information indicating a relation between a subject distance and a position of each of the plurality of lens units, position information about a single position representing positions of the plurality of lens units corresponding to a current subject distance;

transmitting, to the camera, one piece of focus sensitivity information determined from the respective positions of the plurality of lens units; and controlling the respective positions of the plurality of lens units based on the position information.

\* \* \* \* \*